US008843837B2

(12) United States Patent
Jeyabalan et al.

(10) Patent No.: US 8,843,837 B2
(45) Date of Patent: Sep. 23, 2014

(54) GRAPHICAL CONFIGURATION AND MANAGEMENT OF INTERFACES

(75) Inventors: Chidambaram Jeyabalan, Broomfield, CO (US); Ronald Haworth, Lafayette, CO (US)

(73) Assignee: McKesson Financial Holdings

( * ) Notice: Subject to any disclaimer, the term of this patent is extended or adjusted under 35 U.S.C. 154(b) by 837 days.

(21) Appl. No.: 12/349,023

(22) Filed: Jan. 6, 2009

(65) Prior Publication Data

US 2010/0175010 A1 Jul. 8, 2010

(51) Int. Cl.
*G06F 3/048* (2013.01)
*H04L 12/24* (2006.01)
*G06F 9/44* (2006.01)

(52) U.S. Cl.
CPC ............ *H04L 41/00* (2013.01); *H04L 41/0803* (2013.01); *G06F 9/4446* (2013.01)
USPC ........... 715/764; 715/736; 715/771; 709/206; 709/227

(58) Field of Classification Search
CPC .............................. G06F 3/048; G06F 3/0481
USPC .................. 715/769, 736, 771; 709/206, 227
See application file for complete search history.

(56) References Cited

U.S. PATENT DOCUMENTS

| | | | | |
|---|---|---|---|---|
| 6,445,682 B1 * | 9/2002 | Weitz | ............ | 370/257 |
| 6,538,669 B1 * | 3/2003 | Lagueux et al. | ............ | 715/764 |
| 6,664,978 B1 * | 12/2003 | Kekic et al. | ............ | 715/733 |
| 7,493,310 B2 * | 2/2009 | Eryurek et al. | ............ | 1/1 |
| 2002/0095310 A1 * | 7/2002 | Kobayashi et al. | ............ | 705/1 |
| 2003/0179227 A1 * | 9/2003 | Ahmad et al. | ............ | 345/736 |
| 2003/0195934 A1 * | 10/2003 | Peterson et al. | ............ | 709/206 |
| 2005/0216421 A1 * | 9/2005 | Barry et al. | ............ | 705/64 |
| 2007/0250189 A1 * | 10/2007 | Rourke et al. | ............ | 700/90 |
| 2007/0250191 A1 * | 10/2007 | Rourke et al. | ............ | 700/90 |
| 2007/0300172 A1 * | 12/2007 | Runge et al. | ............ | 715/764 |
| 2009/0131020 A1 * | 5/2009 | van de Groenendaal | ..... | 455/411 |
| 2010/0131652 A1 * | 5/2010 | Brewis et al. | ............ | 709/227 |
| 2011/0154237 A1 * | 6/2011 | Bush et al. | ............ | 715/771 |

* cited by examiner

*Primary Examiner* — Linh K Pham
(74) *Attorney, Agent, or Firm* — Alston & Bird LLP

(57) ABSTRACT

System, methods, and computer program products are provided for creating, managing, and configuring interfaces and communications profiles of systems or networks. The system may receive input placing a first graphical image (associated with a communications profile) on a pane, receive input defining one or more of the attributes and/or parameters of the communications profile, and create or configure an interface in accordance with the communications profile.

21 Claims, 18 Drawing Sheets

GRAPHICAL CONFIGURATION AND MANAGEMENT OF INTERFACES

BACKGROUND OF THE INVENTION

Computer networks often integrate diverse platforms and software applications spanning one or more locations. For instance, in a computer network, heterogeneous nodes (e.g., computing devices, systems, and interfaces) often need to electronically communicate information with each other using a variety of software applications. The ability to provide inter-application communication is enabled through message transmission, routing, processing, and storage by configuring and managing the communications interfaces at the various nodes. However, the configuration and management of the communications interfaces is a complicated, time-consuming, and highly-specialized endeavor. Moreover, the complexity and time requirements of configuring and managing the nodes are exacerbated when the number of nodes that need to be configured and/or managed is increased, such as in a hospital computer system that communicates with other systems at clinics, medical offices, and laboratories. Thus, there exists a need for a solution that makes the configuration and management of communications interfaces simple and repeatable.

BRIEF SUMMARY OF VARIOUS EMBODIMENTS OF THE INVENTION

In general, embodiments of the present invention provide systems, methods, and computer program products for creating, configuring, and managing interfaces. In particular, the systems, methods, and computer program products provide for a graphical way to configure, manage, and replicate the interfaces and to edit and manage the messages of the interfaces.

In accordance with one aspect, a computer-implemented method is provided. In one embodiment, the method may include receiving input initiating a configuration of one or more communications interfaces; identifying one or more graphical images placed on a pane; identifying one or more communications profiles associated with the respective one or more graphical images placed on the pane, wherein each of the one or more communications profiles defines a plurality of communication parameters; and configuring the one or more communications interfaces in accordance with the one or more communications profiles associated with the respective one or more graphical images.

In accordance with another aspect, a computer program product is provided, which contains at least one computer-readable storage medium having computer-readable program code portions stored therein. The computer-readable program code portions of one embodiment may include: a first executable portion configured to receive input initiating a configuration of one or more communications interfaces; a second executable portion configured to identify one or more graphical images placed on a pane; a third executable portion configured to identify one or more communications profiles associated with the respective one or more graphical images placed on the pane, wherein each of the one or more communications profiles defines a plurality of communication parameters; and a fourth executable portion configured to configure the one or more communications interfaces in accordance with the one or more communications profiles associated with the respective one or more graphical images.

In accordance with yet another aspect, a system is provided. In one embodiment, the system comprises one or more memory storage areas and one or more processors, the one or more processors configured to: receive input initiating a configuration of one or more communications interfaces; identify one or more graphical images placed on a pane; identify one or more communications profiles associated with the respective one or more graphical images placed on the pane, wherein each of the one or more communications profiles defines a plurality of communication parameters; and configure the one or more communications interfaces in accordance with the one or more communications profiles associated with the respective one or more graphical images.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
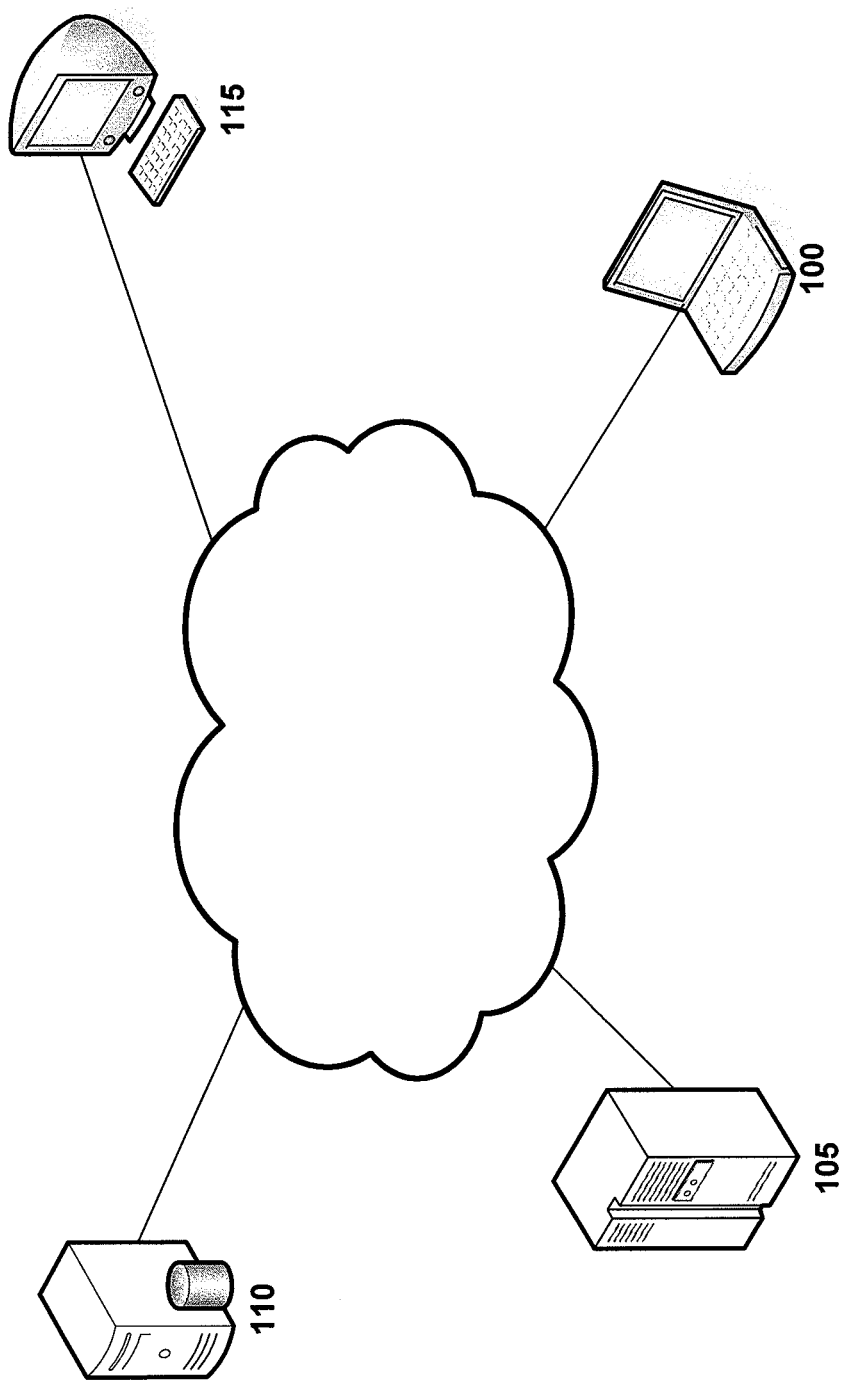
FIG. 1 shows an overview of one embodiment of a system that can be used to practice aspects of the present invention.

FIGS. 5-12, 13A, 13B, and 14-18 show universal input and output produced by one embodiment of the invention.

DETAILED DESCRIPTION OF VARIOUS EMBODIMENTS OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Methods, Apparatus, Systems, and Computer Program Products

As should be appreciated, the embodiments may be implemented as methods, apparatus, systems, or computer program products. Accordingly, the embodiments may take the form of an entirely hardware embodiment, an entirely software embodiment, or an embodiment combining software and hardware aspects. Furthermore, the various implementations may take the form of a computer program product on a computer-readable storage medium having computer-readable program instructions (e.g., computer software) embodied in the storage medium. More particularly, implementations of the embodiments may take the form of web-implemented computer software. Any suitable computer-readable storage medium may be utilized including hard disks, CD-ROMs, optical storage devices, or magnetic storage devices.

The embodiments are described below with reference to block diagrams and flowchart illustrations of methods, apparatus, systems, and computer program products. It should be understood that each block of the block diagrams and flowchart illustrations, respectively, can be implemented by computer program instructions, e.g., as logical steps or operations. These computer program instructions may be loaded onto a general purpose computer, special purpose computer, or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

Brief Overview

In general, according to various embodiments of the present invention, methods, apparatus, systems, and computer program products are provided for creating, managing, and configuring interfaces of systems or networks. For example, once logged on to a management computing device, a user can perform various functions, such as interface configuration and administration. In one embodiment, to configure an interface, the management computing device receives input from the user placing a graphical image (associated with a communications profile) on a map. The management computing device can also receive input defining the attributes and parameters of the communications profile. For example, the input may include the interface's name, description, logging status, start type, administrative password, external connections, and message format. After the attributes and/or parameters of the communications profile have been properly defined and checked for errors via the management computing device, the attributes and parameters of the communications profile can be committed to the appropriate interface. For example, in one embodiment, the management computing device generates and transmits interface configuration files to configure the interface.

In addition to configuring interfaces (systems and networks), the management computing device can also determine and display the status of each interface. Moreover, the management computing device can also provide the functionality of viewing, editing, sending, and/or resending messages from queues and/or stacks of the various interfaces. For example, in one embodiment, the management computing device can provide a queue viewer through with the user can "drag and drop" messages from one queue to another or move messages between systems. Via these and other components, the management computing device provides the functionality for creating, managing, and configuring interfaces of systems or networks Exemplary System Architecture FIG. 1 provides an illustration of one type of system that can be used in conjunction with various embodiments of the present invention. As shown in FIG. 1, the system may include a management computing device 100, a hospital system 105, a clinic system 110, and a laboratory system 115. In general, the terms "computing device" and "system" are used generically throughout to refer to any computer, mainframe, desktop, notebook or laptop, distributed system, router, server, interface, engine, gateway, switch, or processing device configured to perform the functions described herein. Each of the systems and computing devices may be in electronic communication with one another over the same or different wireless or wired networks including, for example, a wired or wireless Personal Area Network ("PAN"), Local Area Network ("LAN"), Metropolitan Area Network ("MAN"), Wide Area Network ("WAN"), and/or the like. Additionally, while FIG. 1 illustrates the various computing devices and systems as separate, standalone entities, the various embodiments herein are not limited to this particular architecture. For example, the functionality of the management computing device 100 may occur on a single server, a mainframe computer system, multiple distributed or centralized servers, or similar computer systems or network entities.

Figure 2:
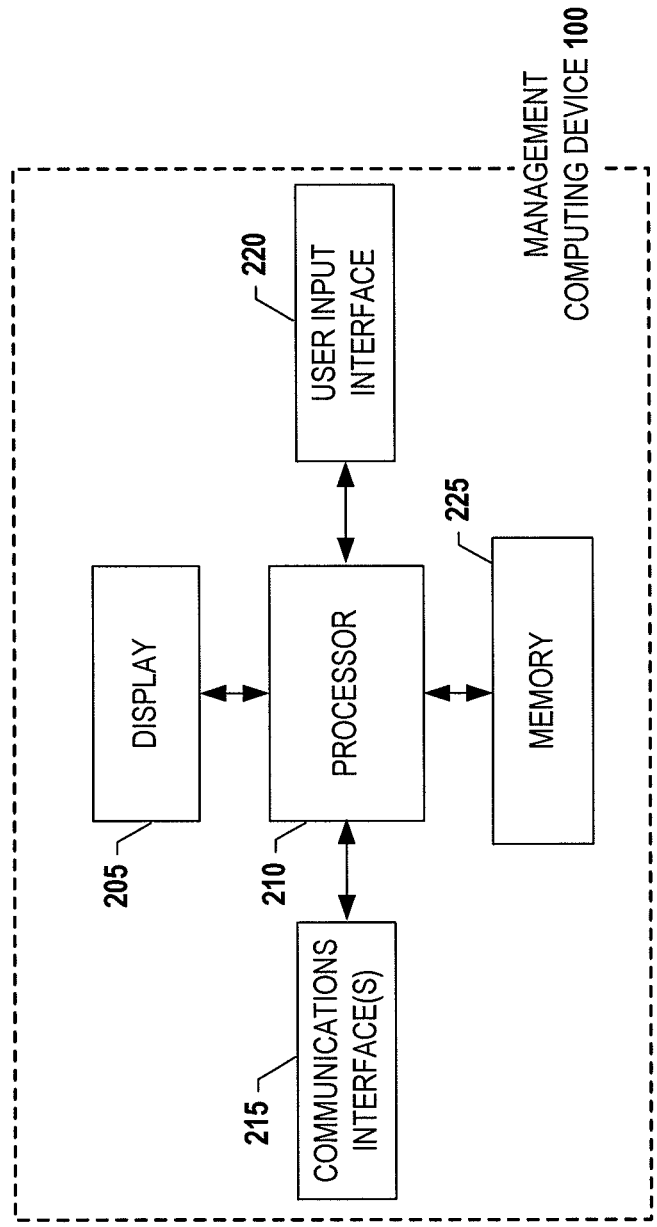
FIG. 2 shows a schematic of an electronic device according to one embodiment of the invention.

FIG. 2 illustrates a block diagram of the management computing device 100. The management computing device 100 may include various means for performing one or more functions in accordance with exemplary embodiments of the invention, including those more particularly shown and described herein. More particularly, for example, as shown in FIG. 2, the management computing device 100 includes a processor 210 connected to a memory 225. The processor 210 may be embodied in a number of different ways. For example, the processor 210 may be embodied as various processing means such as a processing element, a coprocessor, a controller, or various other processing devices including integrated circuits such as, for example, an ASIC (application specific integrated circuit), an FPGA (field programmable gate array), a hardware accelerator, or the like. In an exemplary embodiment, the processor 210 may be configured to execute instructions stored in the memory device 225 or otherwise accessible to the processor 210. As such, whether configured by hardware or software methods, or by a combination thereof, the processor 210 may represent an entity capable of performing operations according to embodiments of the present invention while configured accordingly. The memory can comprise volatile memory and/or non-volatile memory (e.g., removable multimedia memory cards ("MMCs"), secure digital ("SD") memory cards, Memory Sticks, electrically erasable programmable read-only memory ("EEPROM"), flash memory, or hard disk) and store content, data, and/or the like. For example, the memory may store content transmitted from, and/or received by, the management computing device 100. The memory may be capable of storing data including but not limited to configuration profiles for communications interfaces and various communication messages. The Electronic Data Interchange ("EDI") messages may conform, for example, to the Health Level 7 protocol ("HL7"), National Council for Prescription Drug Programs ("NCPDP") format, Accredited Standards Committee ("ASCX12") format, generic extensible markup language ("XML") format, or other industry-standard electronic data representations.

Also for example, the memory typically stores client applications, instructions, and/or the like for instructing the processor 210 to perform steps associated with the operation of the management computing device 100 in accordance with embodiments of the present invention. As explained below, for instance, the memory 225 can store one or more client application(s), such as software associated with the generation of medical data as well as handling and processing of one or more medical images.

In addition to the memory 225, the processor 210 can also be connected to at least one interface or other means for displaying, transmitting and/or receiving data, content, and/or the like. The interface(s) can include at least one communications interface 215 or other means for transmitting and/or receiving data, content, and/or the like. In this regard, the communications interface 215 may include, for example, an antenna (not shown) and supporting hardware and/or software for enabling communications with a wireless communication network. For instance, the communications interface(s) can include a first communications interface for connecting to a first network, and a second communications interface for connecting to a second network. In this regard, the management computing device 100 may be capable of communicating with other electronic devices or systems over various wired and/or wireless networks, such as a Local Area Network ("LAN"), Wide Area Network ("WAN"), Wireless Wide Area Network ("WWAN"), the Internet, and/or the like. This communication may be via the same or different wired or wireless networks (or a combination of wired and wireless networks), as discussed above. With respect to wired networks, the communication may be executed using a wired data transmission protocol, such as fiber distributed data interface ("FDDI"), digital subscriber line ("DSL"), Ethernet, asynchronous transfer mode ("ATM"), frame relay, data over cable service interface specification ("DOCSIS"), or any other wired transmission protocol. Similarly, the management computing device 100 may be configured to communicate via wireless external communication networks using any of a variety of protocols, such as 802.11, general packet radio service ("GPRS"), wideband code division multiple access ("W-CDMA"), any of a number of second-generation ("2G") communication protocols, third-generation ("3G") communication protocols, and/or the like. Via these communication standards and protocols, the management computing device 100 can communicate with the various other electronic entities. The management computing device 100 can also download changes, add-ons, and updates, for instance, to its firmware, software (e.g., modules), and operating system. For example, the management computing device 100 may be in communication with various medical imaging devices/systems and/or health care-related devices/systems, such as the hospital system 105, the clinic system 110, and the laboratory system 115.

In addition to the communications interface(s) 215, the interface(s) can also include at least one user interface that can include one or more earphones and/or speakers, a display 205, and/or a user input interface 220. The display 205 may be capable of displaying information including but not limited to medical data. The user input interface 220, in turn, may include any of a number of devices allowing the management computing device 100 to receive data from a user, such as a microphone, a keypad, keyboard, a touch display, a joystick, image capture device, pointing device (e.g., mouse), stylus or other input device. By using the user input interface 220, a user may provide information to configure or manage one or more communications interfaces of various computing devices or systems.

It should be noted that one or more of the management computing device 100 components may be located geographically remotely from the other management computing device 100 components. Furthermore, one or more of the components of the management computing device 100 may be combined within or distributed via other systems or computing devices to perform the functions described herein. Similarly, the described architectures are provided for illustrative purposes only and are not limiting to the various embodiments. The functionality, interaction, and operations executed by the management computing device 100 discussed above and shown in FIG. 2, in accordance with various embodiments of the present invention, are described in the following sections.

Exemplary System Operation

Figure 3:
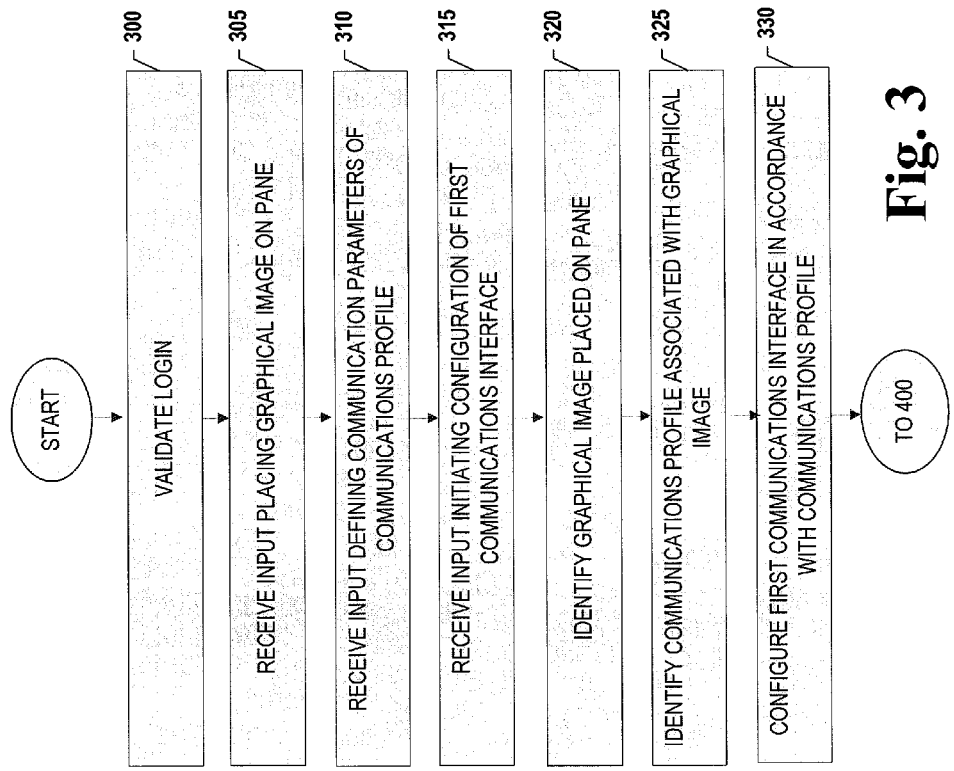
FIGS. 3-4 show flowcharts illustrating operations and processes that can be used in accordance with various embodiments of the present invention.
Figure 4:
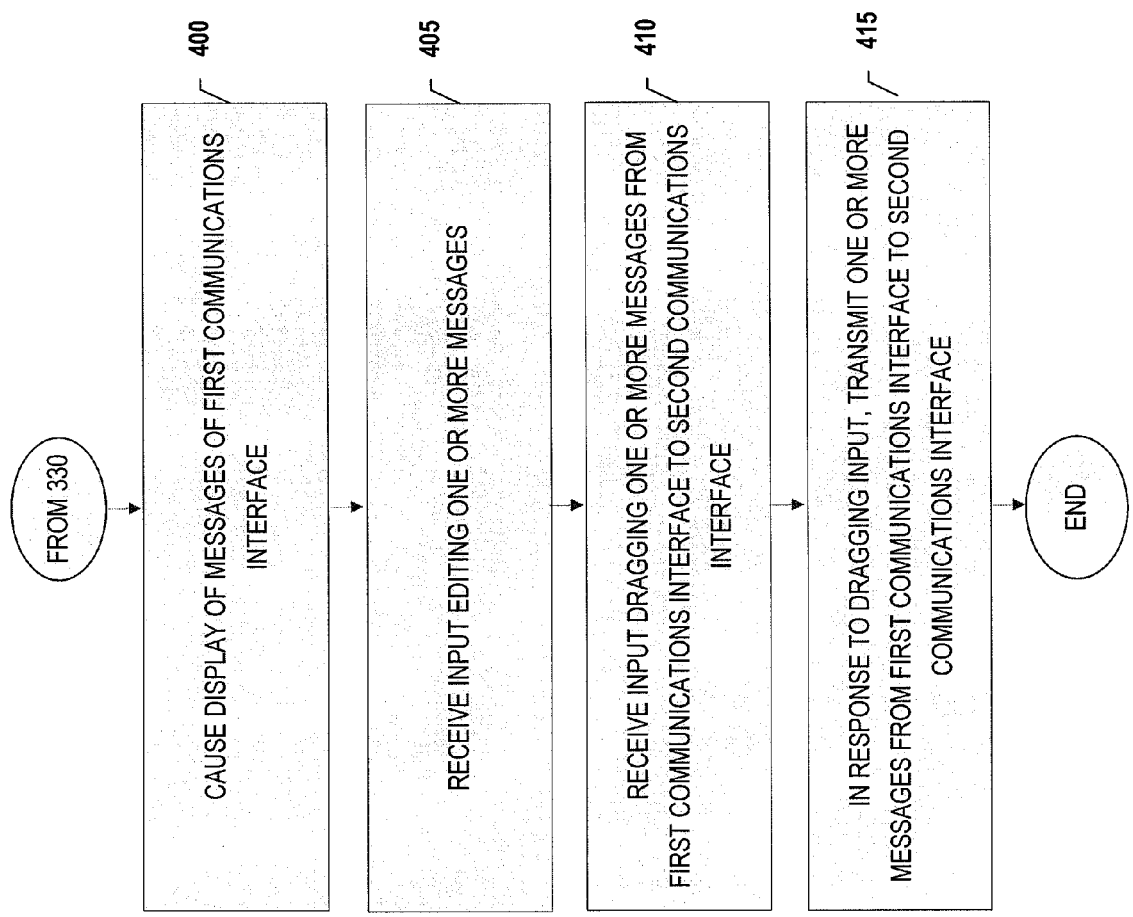
Figure 5:
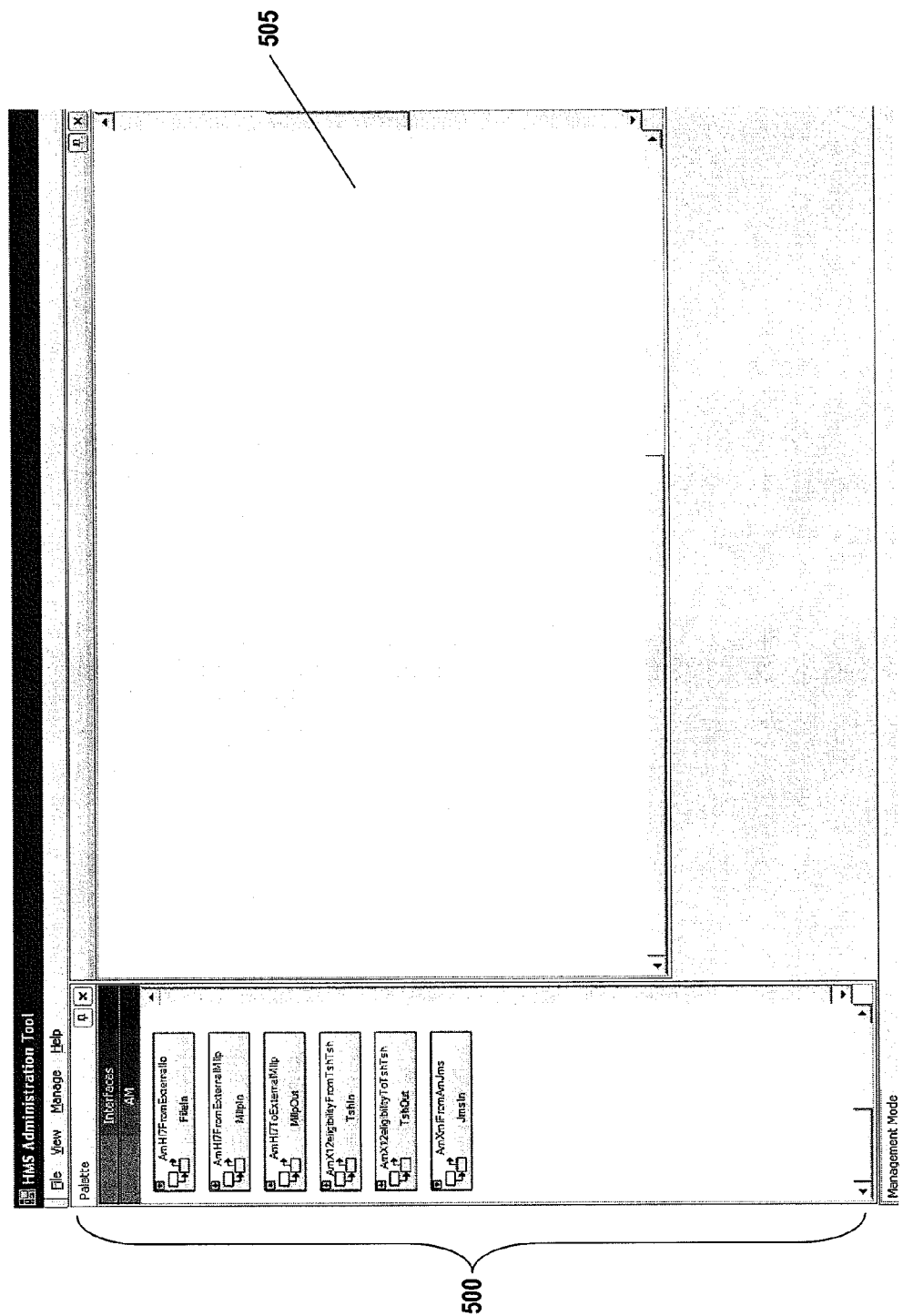
Figure 6:
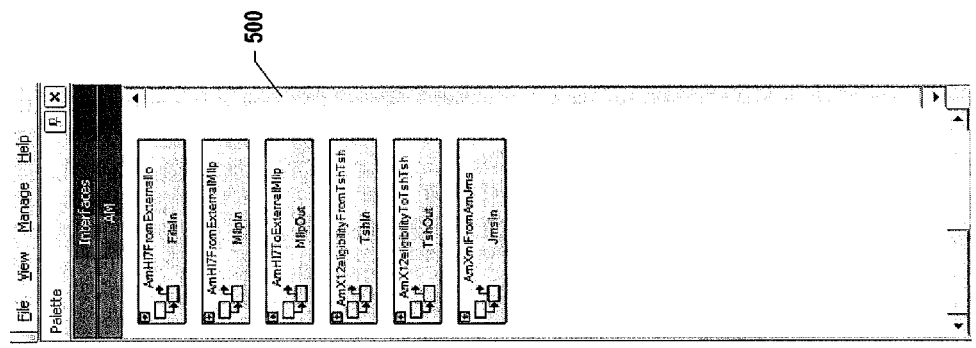
Figure 7:
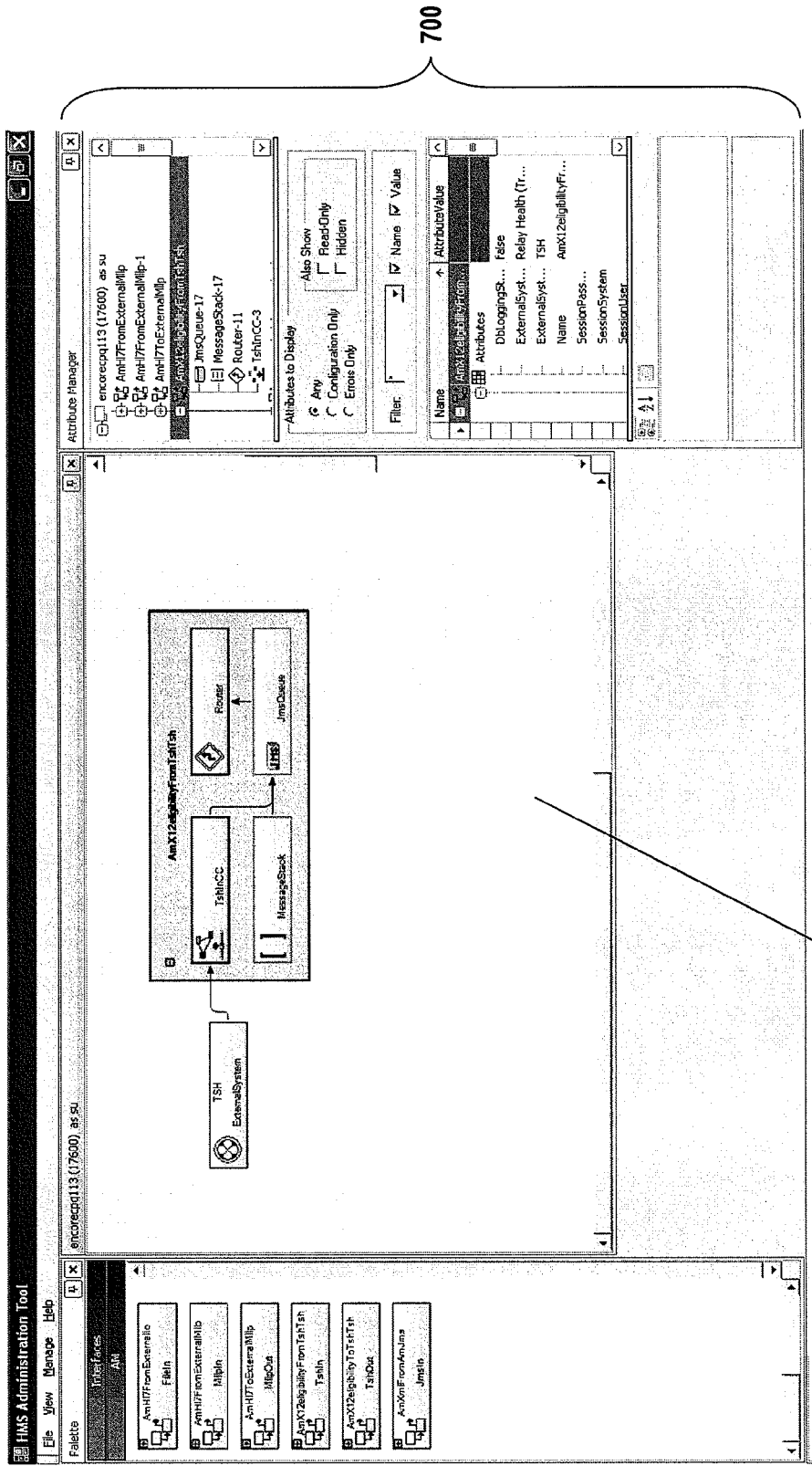
Figure 8:
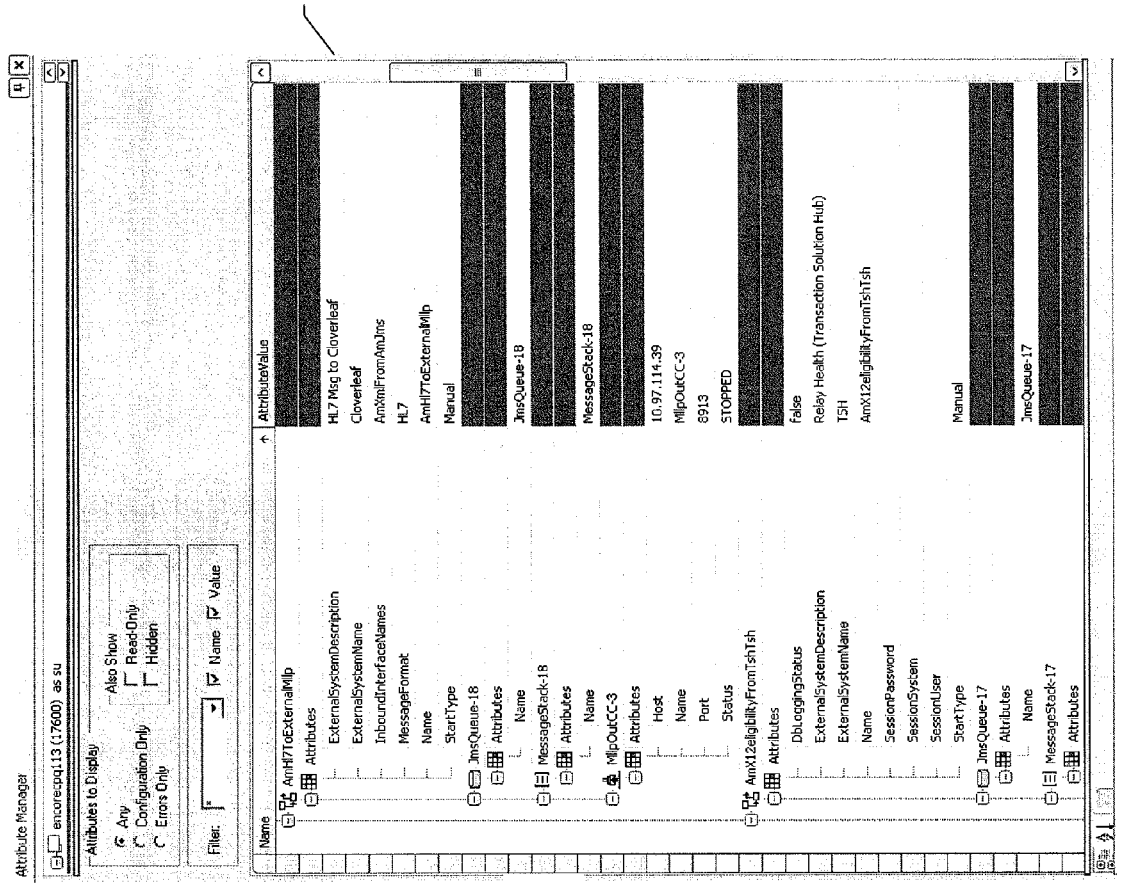
Figure 9:
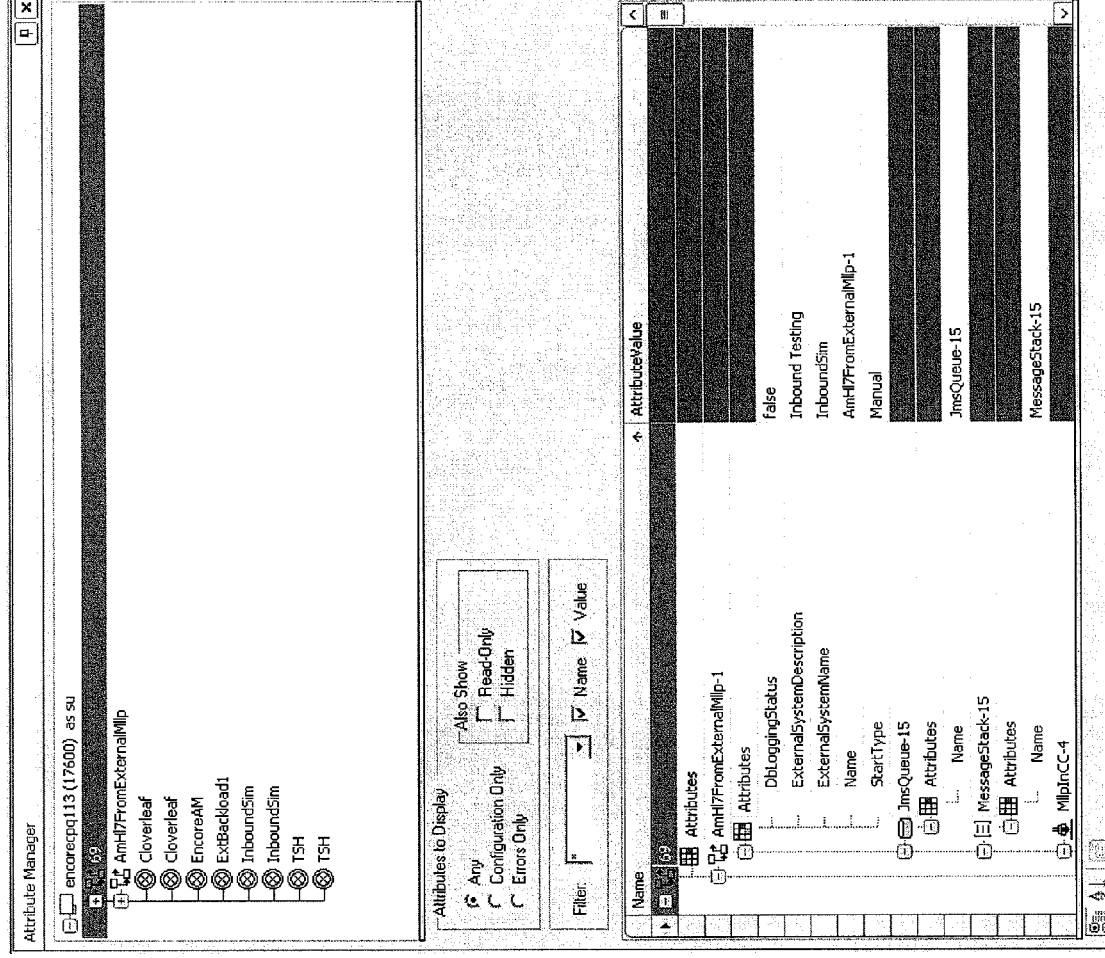
Figure 10:
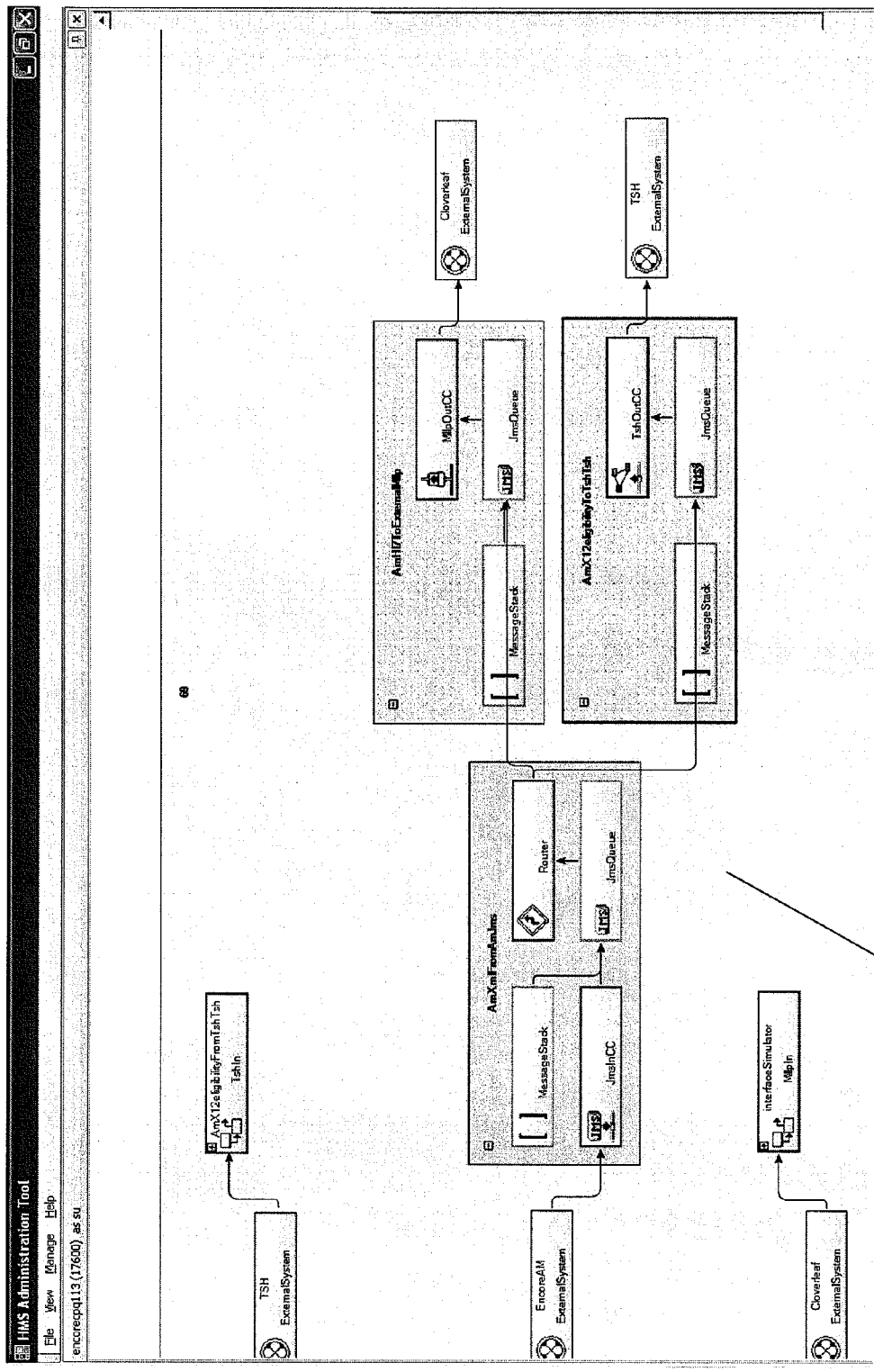

Reference will now be made to FIGS. 3-18, which provide examples of operations and input and output produced by various embodiments of the present invention. In particular, FIGS. 3-4 provide flowcharts illustrating operations that may be performed to manage and configure interfaces of various computing devices and systems. Some of these operations will be described in conjunction with FIGS. 5-12, 13A, 13B, and 14-18, which illustrate input and output that may be produced by carrying out the selected operations described in relation to FIGS. 3-4.

Various enterprises, such as hospitals use a variety of computing devices, systems, and software applications in their daily operations. These computing devices, systems, and software applications often need to communicate with each other, for example, in real time or in batch mode. For instance, a hospital computer network may comprise an admissions system, a pharmacy system, a clinical documentation system, a laboratory system, and a discharge system that need to communicate with each other as well as communicate with external systems (e.g., medical office systems). When the various systems and computing devices communicate with each other, they do so by exchanging messages of a mutually understood structure, such as messages in the HL7 or XML format. In one embodiment, messaging via a mutually understood structure is accomplished by using a system of EDI message processing nodes—also referred to herein as "interfaces." Thus, the term "interface" is used generically to refer to any connection point (e.g., "node") capable of sending, receiving, or forwarding information over a communications channel. The management computing device 100 creates, manages, and configures the interfaces of such systems or networks so that they can communicate with each other. Examples of the creation, configuration, and management of illustrative interfaces are further described herein.

In one embodiment, the process begins by validating a user's credentials when the user logs on to the management computing device 100. Thus, at this step, the management computing device 100 receives the user's login and verifies that the user is authorized to operate management computing device 100 (Block 300) and determines the user's permission level. In this embodiment, there are three default permission levels: Level 1; Level 2; and Level 3. Level 1 provides the user with the ability to, for example, start and stop interfaces, view maps of networks, and view message logs of interfaces. Level 2 provides the user with the same privileges as Level 1, but also includes the ability to suspend, edit, view, and resume message transmissions of interfaces. In addition to the privileges of Level 2, Level 3 provides the user with the ability to create, configure, and delete interfaces. These permission levels may be extended through the addition of new levels, modified to provide customized capabilities, or deleted as required by the user community.

Once logged on to the management computing device 100, the user can perform various functions, such as interface configuration and administration. To configure and manage interfaces, in one embodiment, the management computing device 100 provides the user with panes from which to work. The term "pane" refers to a window (screen or other display portion) displayed by, for example, the management computing device 100. In one embodiment, panes provide the ability to: be docked to other panes; float; be hidden; be unhidden; be tabbed; and be split.

In one embodiment, each pane contains a function or work activity associated with it. For example, there is a pane for a "palette," a "map," and an "attribute manager." Examples of each are shown FIG. 7. The term "palette" generally refers to a pane with graphical images (e.g., icons) that represent interfaces or other reusable network components, such as the exemplary palettes 500 shown in FIGS. 5-7. The term "map" is used generally to refer to a pane for working with interfaces and their components (interface parts), such as the maps 505 shown in FIGS. 5, 7, and 10-12. The "attribute manager" (shown as element 700 in FIGS. 7-9 and 11) is a pane used to define the attributes and parameters of the respective interfaces that are represented as graphical images on the palette 500.

Figure 11:
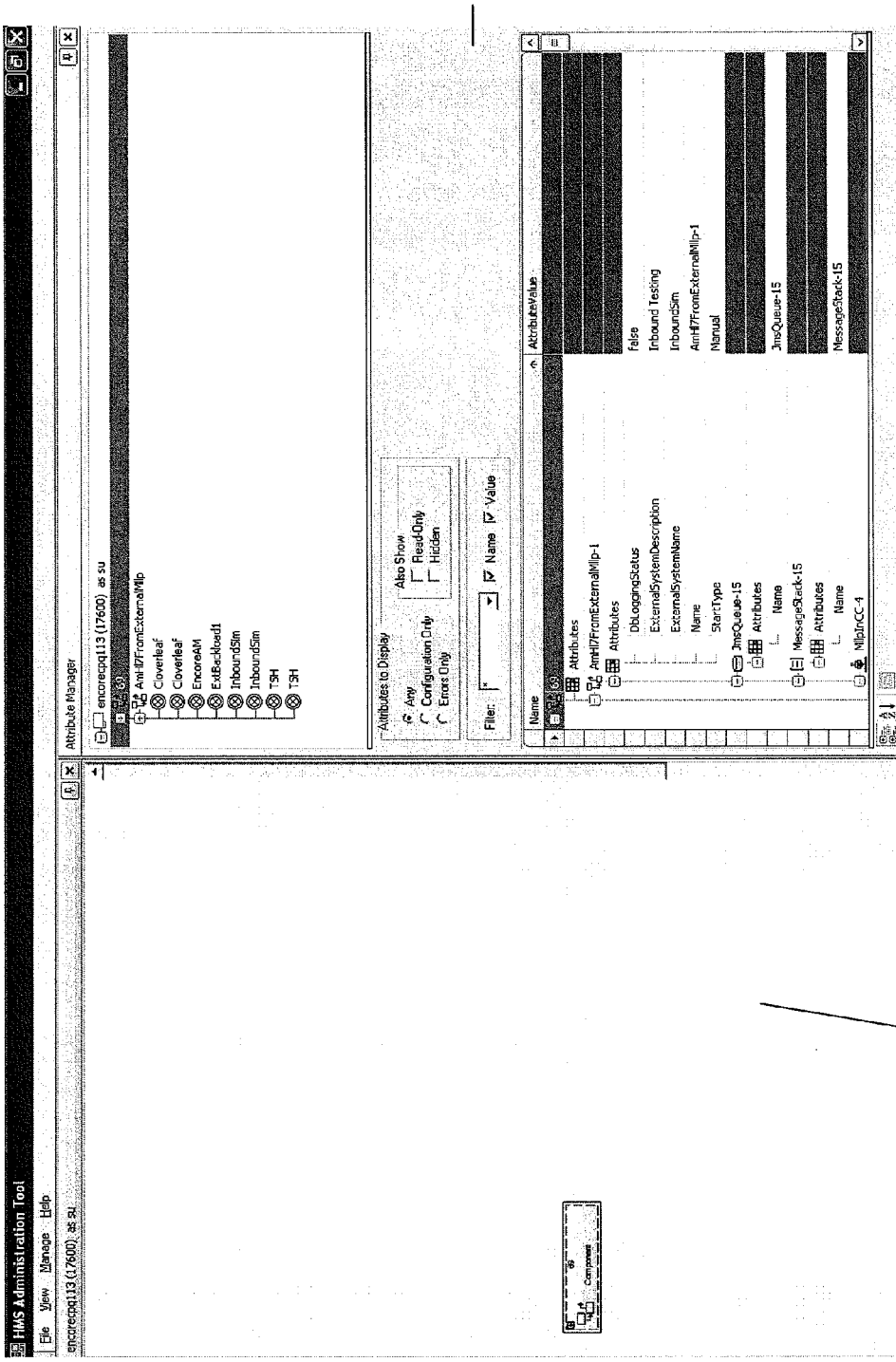
Figure 13A:
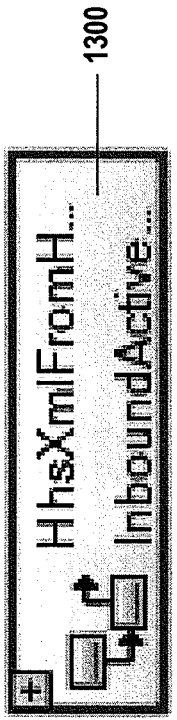
Figure 13B:
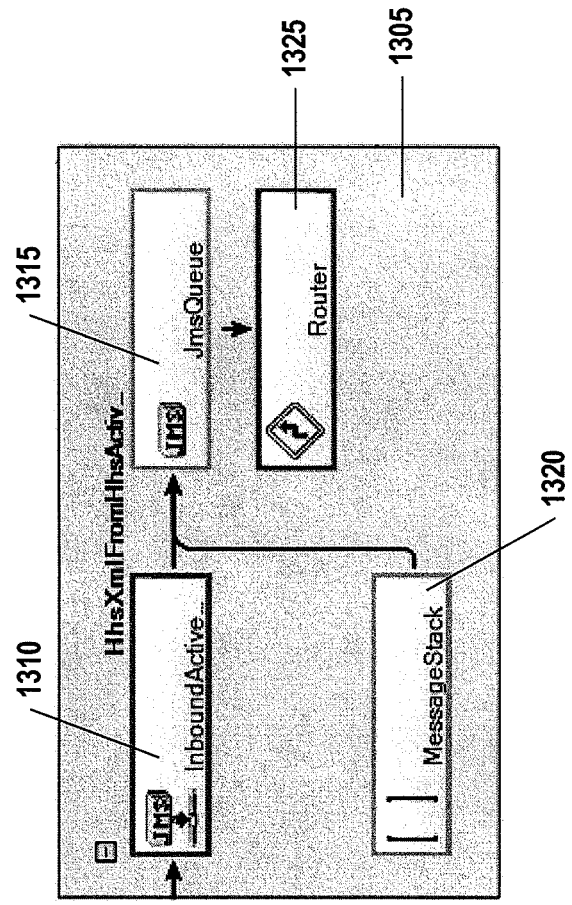

In one embodiment, each graphical image on the palette 500 is associated with one or more communications profiles. That is, a single graphical image may be used to represent one or more interfaces. For example, FIG. 13A shows a "contained" view of element 1300, which is a single graphical image representing a single interface. The interface represented by element 1300 comprises four interface components (described in greater detail below). The interface and its four components are also shown in an "expanded" view in FIG. 13B by element 1305. Thus, a "contained" view of the interface is a collapsed or non-expanded view of the interface and its components, and the "expanded" view of the interface displays the interface and it components. This provides the user with the functionality to group a collection of networked interfaces into a "container" (e.g., graphical image representing the collection). In addition, the status of each interface, system, or network percolates up to the higher level container(s). Thus, if one interface represented by the container, for example, is not functioning properly, the higher level container(s) will reflect that there is a problem with one of the interfaces represented by the container. In that regard, the user can expand the container (e.g., there may be multiple layers or levels of expansion and therefore multiple container levels) to drill down to the specific interface with the problem. The contained and expanded views can also be extended to multiple communications profiles (e.g., interfaces with their respective components) represented by a single graphical image. For example, each of the interfaces shown on the map 505 of FIG. 10 can be represented by a single graphical image, such as the graphical image shown on the map 505 of FIG. 11. In other words, the graphical image shown on the map 505 of FIG. 11 is a contained view of all of the interfaces shown on the map 505 of FIG. 10. Thus, in this example, a single graphical image can be used to represent an entire system or network. Similarly, if the management computing device 100 were to display the expanded view of an entire system or network, first, second, third, etc. interfaces would be represented on the map 505 by first, second, third, etc. graphical images respectively. In working with the interfaces, the user may choose to view the interfaces in a contained view, for example, to reduce the amount of space used by the interfaces on the map 505 or to see a simplified summary view of the contained interfaces. Or the user may choose to view the interfaces in an expanded view to, for instance, configure the attributes and parameters of the interfaces.

As described above, in one embodiment, each graphical image may be associated with a single communications profile and therefore a single communications interface and its components. For example, as shown in FIGS. 13A (contained view) and 13B (expanded view), the interface identified as "HhsXmlFromH . . . " comprises four components: a communications client 1310; a queue 1315; a stack 1320; and a router 1325. Generally, the "communications client" 1310 is a hardware and/or software component responsible for establishing communication with other systems. That is, it sends and receives messages. The "stack" 1320 is a memory storage area that stores messages, such as messages recently received from another queue 1315, system, or log. The "queue" 1315 is a memory storage area for messages that are waiting to be processed or transmitted by the interface. The "router" 1325 is a hardware and/or software component that removes message from the queue 1315 and performs processing actions on the messages, such as translating or encapsulating the messages and providing them to the communications client 1310 for transmission. In one embodiment, the queue 1315 is configured such that messages in the queue 1315 are backed by a relational database and have full protection and management (e.g., backup and recovery, tuned operation, and scalability).

In one embodiment, to configure, create, or manage an interface(s), the user works with the palette 500, map 505, and attribute manager 700. For instance, to create an interface, the management computing device 100 receives input from a user to associate a graphical image on the palette 500 with a communications profile. As discussed above, each graphical image is associated with a communications profile, such as the communications profiles shown in the attribute managers 700 of FIGS. 7-9. In one embodiment, the communications profiles are received or stored with some or all of the attributes and parameters predefined, such as the name of the interface or the default ports. In another embodiment, the communications profiles do not define any of the attributes or parameters of the interface. After associating a graphical image with a communications profile, the management computing device 100 receives input placing the graphical image on the map 505 (Block 305). The term "placing" is used generically to refer to functions such as a drag-and-drop, insert, and cut and paste. In one embodiment, when a graphical image is placed on the map 505, it is outlined by dashed lines to indicate that its associated communications profile requires further configuration or has not been instantiated. After receiving this input, the management computing device 100 displays the graphical image on the location of the map 505 indicated. In addition to placing the graphical image on the map 505, the user can move the graphical image to any portion of the map 505 and view contained and expanded views of the interface(s) associated with the graphical image.

At this point the to-be-created interface(s) has been identified by being placed on the map 505. Then, in one embodiment, the management computing device 100 receives input, e.g., from the user, defining one or more attributes and/or parameters of the communications profile (Block 310). For example, the details of the communications profile are displayed by the management computing device 100 via the attribute manager 700. The attribute manager 700 can be used to define a variety of attributes and parameters, such as the interface's name, description, logging status, Internet Protocol ("IP") address, start type, administrative password, external connections, and message format.

In one embodiment, the attribute manager 700 can enforce a variety of constraints on the attributes and parameters received as input. For example, the attribute manager 700 may limit the input choices via a drop down menu or combo box. Similarly, the attribute manager 700 may require the input to follow a specific pattern type (e.g., a valid network drive location starting with "C:\") or range from one integer to another integer. By enforcing constraints on the input, the management computing device 100 can limit the number of configuration errors that could otherwise be introduced via the input. The communications profile can also be checked for errors and/or missing attribute or parameter information to ensure proper creation and configuration. The management computing device 100, via the attribute manager 700, can also provide "tree views" of all interfaces and their components (shown in FIGS. 7-9 and 11) and filter the attributes and parameters that require attention.

To connect one interface to another, in one embodiment, the management computing device 100 can receive input from a user graphically drawing a line from one interface to another (e.g., identifying a communications link). By graphically drawing the line, the management computing device 100, in one embodiment, can automatically define (based on the attributes and/or parameters of each interface) some of the communications parameters to ensure proper communication between the interfaces. For example, in operation, a user can mouse over (e.g., hover over) the edge of an inbound interface's router 1325, after which the mouse pointer changes to indicate that a connection can be drawn from the interface. At this point, the user can press the mouse button and drag a "rubber band" line from the router 1325 to the vicinity of another component (e.g., a queue 1315 on an outbound interface) and the rubber band line will "snap" to the eligible component as the mouse nears it. Similarly, if the mouse is moved away, the line will un-snap. As the user continues holding the mouse button and moving the mouse around the map, the rubber band line will successively snap to the closest eligible interface component. Thus, in this embodiment, only physically realizable connections are suggested (and ultimately allowed).

In one embodiment, each interface, system, and/or network created or configured via the management computing device 100 can be saved as a template for other interfaces, systems, and networks. That is, the graphical images and their associated communications profiles can be saved for reuse. Thus, if the user has multiple interfaces (systems or even networks) that require the same (or similar) configuration, she can save the configuration as a template and reuse the template to configure additional interfaces (systems or even networks). For example, reusing a template may be as simple as changing the interface name, description, and port numbers. This provides the user with the ability to store complex, custom-designed interfaces (systems or even networks) as reusable templates and recreate an entire network of interfaces (e.g., message processing nodes) by simple drag-and-drop operations, for example. This also allows the reusable templates of interfaces and/or networks of interfaces to be organized in a palette 500 as one or more sub-palettes. Moreover, the templates (e.g., palettes 500 and sub-palettes) can be shared with others via email or other electronic mediums. Thus, after their initial configuration, the templates can be used to create new, consistent networks across an enterprise (e.g., to create complete or partial replicas of a preexisting network) and reused at a later time.

After the communications profile has been properly defined and checked for errors via the management computing device 100, the attributes and parameters of the communications profile can be committed to the appropriate interface. In one embodiment, to commit the configuration (e.g., instantiate an interface) of the communications profile to the interface, the management computing device 100 receives input initiating a configuration (Block 315). The input may be received by a user, for example, right clicking on the interface and selecting "Commit Changes" (shown in FIG. 12). Irrespective of the input source or form, at this point, the management computing device 100 identifies the appropriate graphical image and its associated communications profile and configures the interface. For example, in one embodiment, the management computing device 100 generates and transmits interface configuration files to configure the interface (Blocks 320, 325 330). After an interface has been configured, in one embodiment, its dashed outline is changed to a solid outline to indicate the instantiated status of the interface. Once the changes have been committed, though, the user can still view, edit, and add new properties (e.g., parameters) to the interfaces en masse or individually via the management computing device 100.

In one embodiment, in addition to configuring the interfaces (systems and networks), the management computing device 100 can also determine the status and display the status of each interface. For example, a stopped interface (or an interface with an error) may be displayed in red, while a started (or otherwise functioning interface) may be displayed in green. And as discussed, the status of each interface (system or network) percolates up to the higher level container(s). Thus, if one interface represented by the container is not functioning properly, the higher level container(s) will reflect that a there is a problem by, for example, displaying the container in red.

Figure 12:
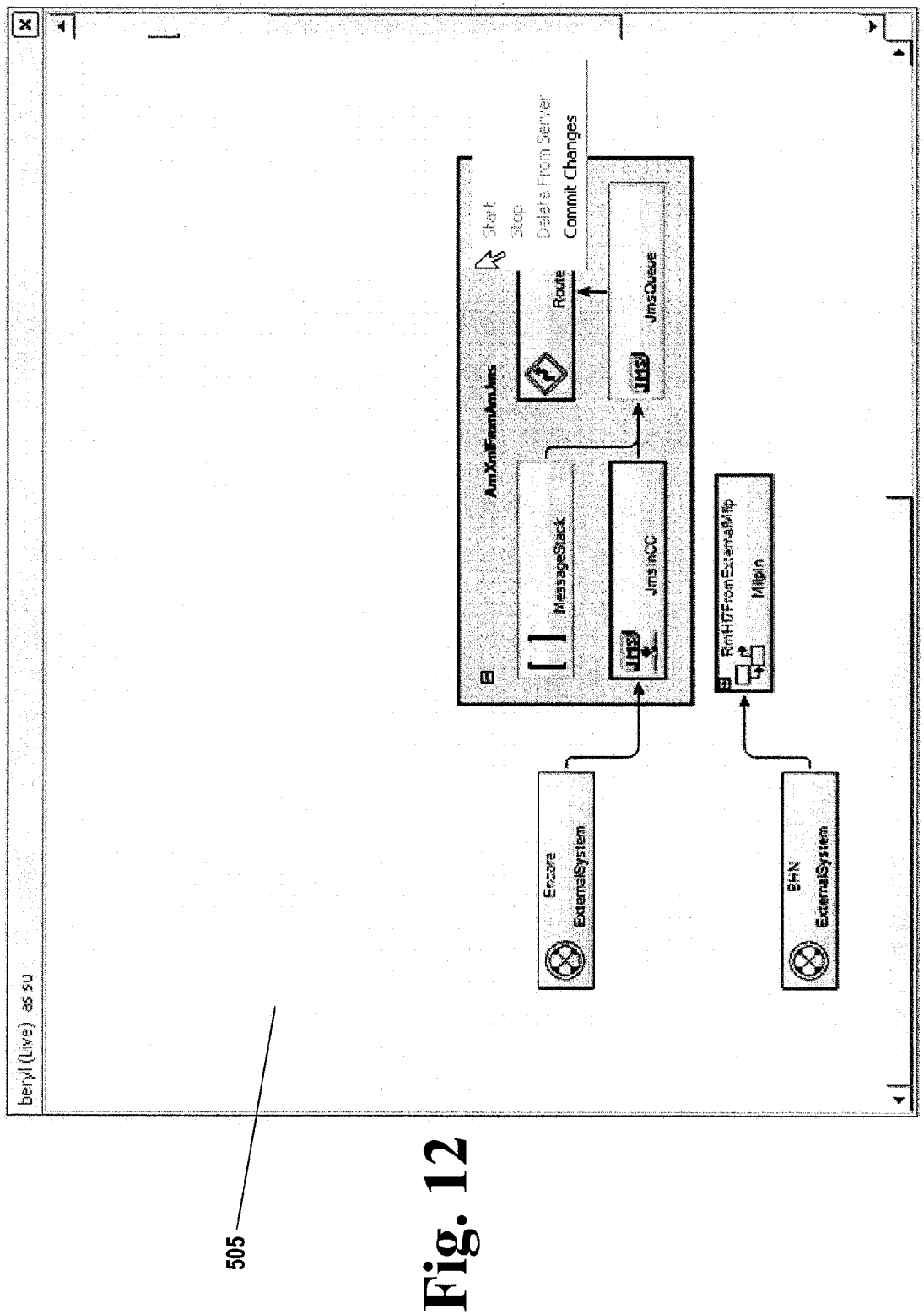

The management computing device 100 can also stop and start the interfaces (as shown in FIG. 12). In one embodiment, when an interface is stopped all inbound and outbound messages in progress will complete processing before the interface processes stop. Starting and stopping an interface via the management computing device 100 may have an impact on inbound and outbound messages, though. For example, stopping an interface may mean that (a) inbound messages are not received from external systems; (b) only messages currently being processed are completed; and (c) the outbound triggered or stored messages are only processed after the interfaces are started again.

Figure 14:
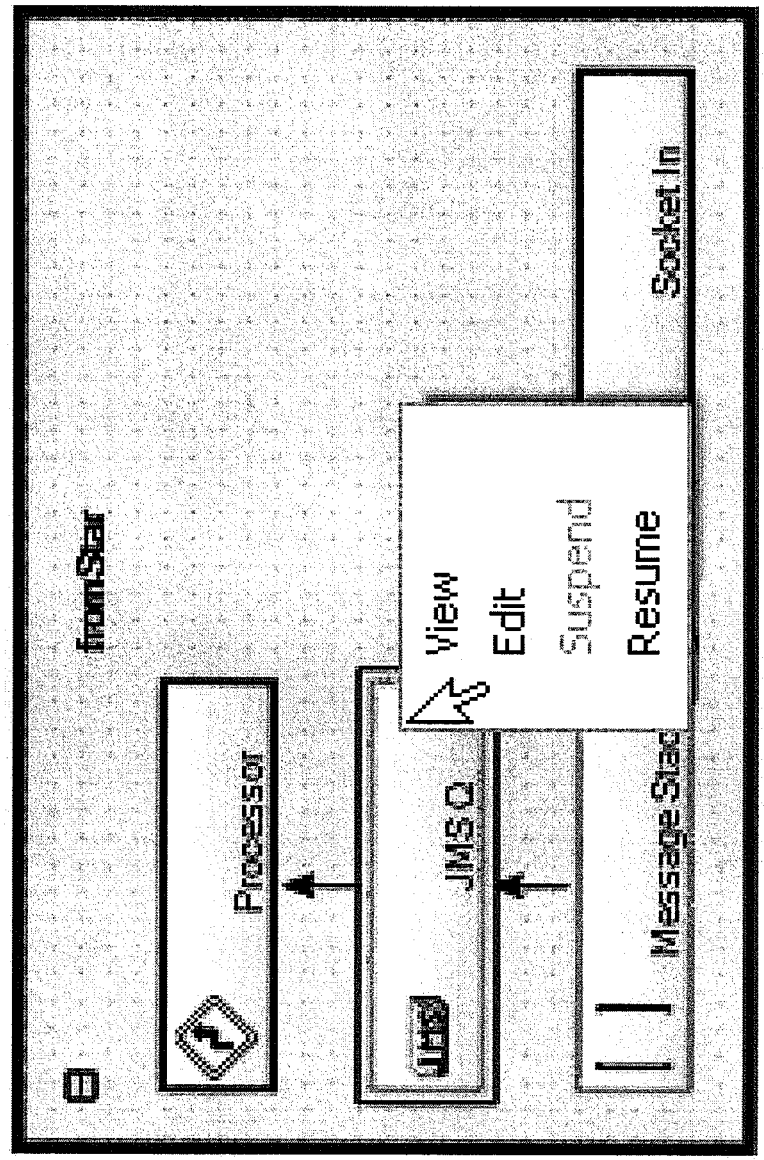
Figure 18:
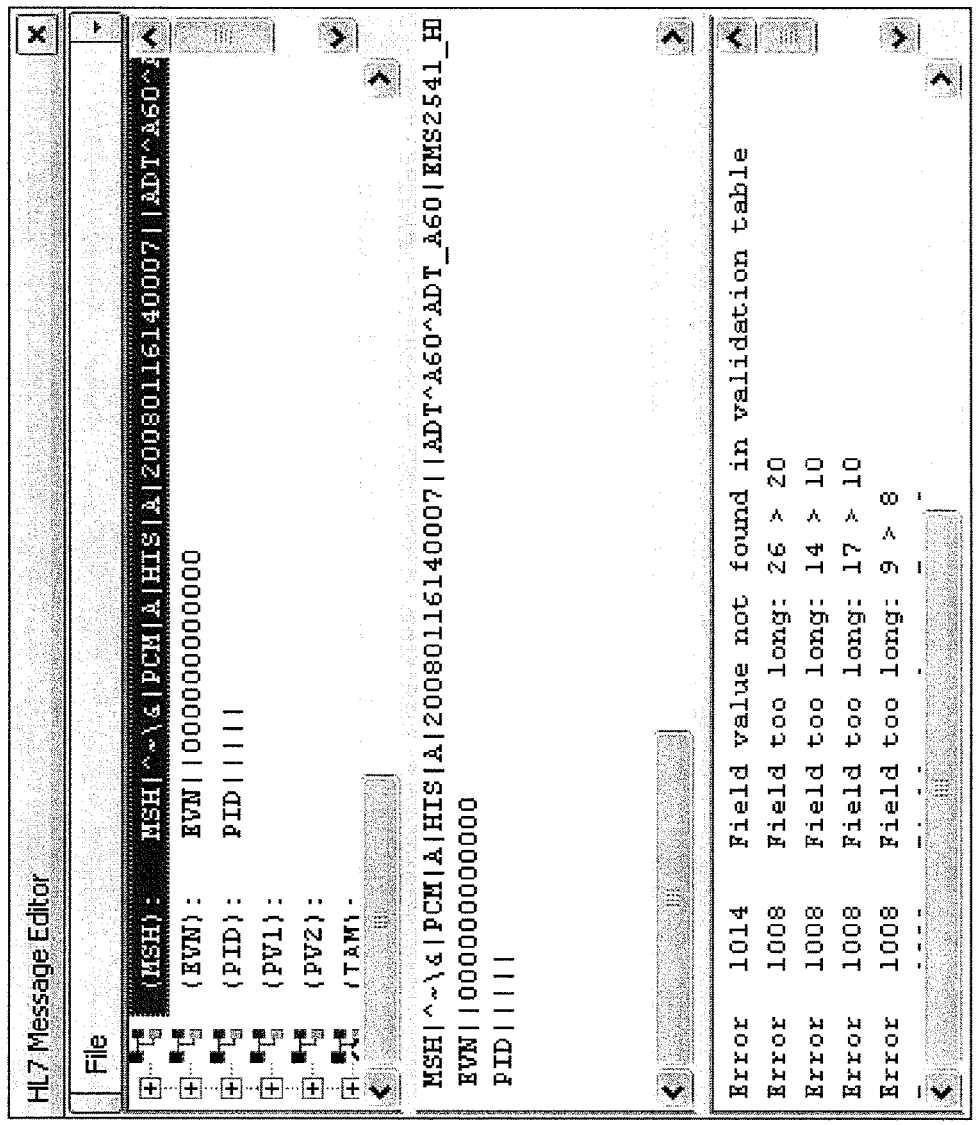

In one embodiment, the management computing device 100 also provides the functionality of viewing, editing, sending, and/or resending messages from queues 1315 and/or stacks 1320. For example, as shown in FIG. 14, the management computing device 100 can provide the user with the ability to input a request to view the messages in a queue 1315 or stack 1320 (e.g., via a graphical interface on the map 505 shown in FIG. 14). After receiving an input requesting display of the contents of a stack 1320 (Block 400), the management computing device 100 can cause display of the messages of the stack 1320 via a log viewer 1600 (such as via the log viewer 1600 shown in FIG. 16). The log viewer 1600 can be independent of the interface and even provide a view of messages from multiple interfaces. Via the log viewer 1600, the user can view audit logs, error logs, and debug logs that relate to specific interfaces. In one embodiment, the log viewer 1600 also provides the functionality of sorting, filtering, querying, and grouping messages. For instance, the log viewer 1600 may provide the ability to filter messages by patient, error, or interface and/or sort by data in any column. The messages can also be exported to, for example, an external program (e.g., a spreadsheet or delimited file) if desired.

In one embodiment, in addition to causing display of the messages in the stack 1320, the management computing device 100 may provide the user with the ability to edit messages and observe system behavior and operational details. With respect to editing messages, the management computing device 100 may receive input from the user via the message editors shown in FIGS. 17-18 to edit a message (Block 405). In one embodiment, if the message is in an XML format, the user can edit the message via the XML message editor. In another embodiment, if the message is in an HL7 format, the user can edit the message via the HL7 message editor. The message editors provide the user with the ability to, for example, change the content, destination, order, or format of the message(s).

If so desired, the log viewer 1600 can also be used to send and/or resend the message from the queue 1315. In one embodiment, to send or resend a message, the user can drag and drop the message from the log viewer 1600 to another log viewer 1600, a queue viewer 1500, a router 1325, a queue 1315, a stack 1320, or a graphical image on a map 505 representing an interface (or select an option to flush the stack 1320). Once the management computing device 100 receives the input (e.g., dragging and dropping) to send a message to another interface, for example, the management computing device 100 transmits the message to the designated destination (Blocks 410, 415). To carry out the transmission, the message is sent to the queue 1315 until it is picked up by the router 1325. The router 1325 then determines if the message requires processing, such as encapsulating an HL7 message in XML and then encoding it in Base64 encoding. In one embodiment, when resending a message, the original message is sent through the interface without any change or reformatting, and a new "MessageID" is appended to the original MessageID to preserve its lineage. The router 1325 can also store the message to databases or apply business processes based on the content of the message. In one embodiment, these rules are predefined or configured within the router 1325. After processing the message, the router 1325 passes the message to one of the outbound interfaces for transmission, such as the communications client 1310.

Similar to causing display of messages via the log viewer 1600, in one embodiment, the management computing device 100 can also provide the functionality of viewing, editing, reordering, deleting, and sending messages of queues 1315. For example, after receiving an input requesting display of the contents of a queue 1315 (Block 400), the management computing device 100 can cause display of the messages of the queue 1315 via a queue viewer 1500 (such as via the queue viewer 1500 shown in FIG. 16). The queue viewer 1500 can be independent of the interface and even provide a view of messages from multiple interfaces. The queue viewer 1500 can also provide the functionality of sorting, filtering, and grouping messages (e.g., filtering on a specific message type or ID and sorting data in a column by date). As with the log viewer 1600, the messages displayed in the queue viewer 1500 can also be exported to, for example, an external program (e.g., a spreadsheet or delimited file) if desired.

In addition to causing display of the messages in the stack 1320, in one embodiment, the management computing device 100 may provide the user with the ability to edit messages. For example, the management computing device 100 may receive the input from the user via the message editors shown in FIGS. 17-18 (Block 405). In one embodiment, if the message is an XML format, the user can edit the message via the XML message editor. In another embodiment, if the message is in an HL7 format, the user can edit the message via the HL7 message editor. The message editors provide the user with the ability to, for example, change the content, destination, order, or format of the message(s). If so desired, the queue viewer 1500 can also be used to send messages from the queue 1315. For example, in one embodiment, the queue viewer 1500 can be used to "drag and drop" messages from one queue 1315 to another, move messages between systems, and flush messages in the queue 1315. Thus, to send or resend a message from a queue 1315, the user can drag and drop a message from the queue viewer 1500 to another log viewer 1600, a queue viewer 1500, a router 1325, a queue 1315, a stack 1320, or a graphical image representing an interface (or select an option to flush the stack 1320). Once the management computing device 100 receives the input (e.g., dragging and dropping) to send the message to another interface, for example, the management computing device 100 transmits the message to the designated destination. In one embodiment, to carry out the transmission, the message is sent to the queue 1315 until it is picked up by the router 1325. The router 1325 then determines if the message requires processing, such as encapsulating an HL7 message in XML and then encoding it in Base64 encoding. In one embodiment, when resending a message, the original message is sent through the interface without any change or reformatting, and a new MessageID is appended to the original MessageID to preserve its lineage. After processing the message, the router 1325 passes the message to one of the outbound interfaces for transmission, such as the communications client 1310. These tools provide the user with a mechanism to search, sort, group, rearrange, edit, and delete messages in the queues 1315 of the various interfaces. Moreover, it provides the user with the ability to send and resend messages by, for instance, dragging and dropping messages from a queue viewer 1500 to another queue 1315, stack 1320, and/or interface.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   electronically receiving input placing one or more graphical images on a pane to configure one or more communications interfaces for subsequent use, wherein (a) placing is selected from the group consisting of dragging and dropping, inserting, copying and pasting, and cutting and pasting, (b) each graphical image is associated with one or more communications profiles, and (c) each of the one or more communications profiles comprises a plurality of predefined communications parameters for configuring a communications interface;
   electronically identifying the one or more communications profiles associated with the respective one or more graphical images placed on the pane;
   electronically receiving input initiating a configuration of the one or more communications interfaces in accordance with the one or more communications profiles associated with the respective one or more graphical images;
   electronically configuring the one or more communications interfaces in accordance with the one or more communications profiles and the plurality of predefined communications parameters associated with the respective one or more graphical images;
   causing display of one or more messages from a queue of a first communications interface of the one or more communications interfaces;
   receiving input dragging at least one of the one or more messages from the queue of the first communications interface to a queue of a second communications interface; and transmitting the at least one of the one or more messages from the queue of the first communications interface to the queue of the second communications interface in response to receiving the dragging input.

2. The method of claim 1, wherein configuring comprises generating and transmitting one or more configuration files to the one or more communications interfaces respectively.

3. The method of claim 2, wherein the input received placing the one or more graphical images on the pane comprises input dragging the one or more graphical images on the pane.

4. The method of claim 1 further comprising receiving input defining at least one of the communications parameters of the respective one or more communications profiles.

5. The method of claim 4 further comprising validating the received input defining the at least one of the communications parameters.

6. The method of claim 1 further comprising causing display of a network graphical image on the pane, the network graphical image representing the one or more communications interfaces.

7. The method of claim 6 further comprising:
receiving information indicating the operational status of the one or more communications interfaces; and
causing display of the status of the one or more communications interfaces via the network graphical image.

8. The method of claim 7 further comprising indicating the operational status of the one or more communications interfaces by changing an attribute of the network graphical image.

9. The method of claim 1, further comprising:
causing display of one or more messages from a memory of the first communications interface of the one or more communications interfaces;
receiving input dragging at least one of the one or more messages from the memory of the first communications interface to a memory of the second communications interface; and
transmitting the at least one of the one or more messages from the memory of the first communications interface to the memory of the second communications interface in response to receiving the dragging input.

10. A computer program product comprising at least one non-transitory computer-readable storage medium having computer-readable program code portions stored therein, the computer-readable program code portions comprising:
an executable portion configured to receive input placing one or more graphical images on a pane to configure one or more communications for subsequent use, wherein (a) placing is selected from the group consisting of dragging and dropping, inserting, copying and pasting, and cutting and pasting, (b) each graphical image is associated with one or more communications profiles, and (c) each of the one or more communications profiles comprises a plurality of predefined communications parameters for configuring a communications interface;
an executable portion configured to identify the one or more communications profiles associated with the respective one or more graphical images placed on the pane; an executable portion configured to receive input initiating a configuration of the one or more communications interfaces in accordance with the one or more communications profiles associated with the respective one or more graphical images;
an executable portion configured to configure the one or more communications interfaces in accordance with the one or more communications profiles and the plurality of predefined communications parameters associated with the respective one or more graphical images;
an executable portion configured to cause display of one or more messages from a queue of a first communications interface of the one or more communications interfaces;
an executable portion configured to receive input dragging at least one of the one or more messages from the queue of the first communications interface to a queue of a second communications interface; and
an executable portion configured to transmit the at least one of the one or more messages from the queue of the first communications interface to the queue of the second communications interface in response to receiving the dragging input.

11. The computer program product of claim 10, wherein to configure the one or more communications interfaces, the executable portion is configured to generate and transmit one or more configuration files to the one or more communications interfaces respectively.

12. The computer program product of claim 11, wherein the input received placing the one or more graphical images on the pane comprises input dragging the one or more graphical images on the pane.

13. The computer program product of claim 10 further comprising an executable portion configured to receive input defining at least one of the communications parameters of the respective one or more communications profiles.

14. The computer program product of claim 13 further comprising an executable portion configured to validate the received input defining the at least one of the of communications parameters.

15. The computer program product of claim 10 further comprising an executable portion configured to cause display of a network graphical image on the pane, the network graphical image representing the one or more communications interfaces.

16. The computer program product of claim 15 further comprising:
an executable portion configured to receive information indicating the operational status of the one or more communications interfaces; and
an executable portion configured to cause display of the status of the one or more communications interfaces via the network graphical image.

17. The computer program product of claim 16 further comprising an executable portion configured to indicate the operational status of the one or more communications interfaces by changing an attribute of the network graphical image.

18. The computer program product of claim 10, further comprising:
an executable portion configured to cause display of one or more messages from a memory of the first communications interface of the one or more communications interfaces;
an executable portion configured to receive input dragging at least one of the one or more messages from the memory of the first communications interface to a memory of the second communications interface; and
an executable portion configured to transmit the at least one of the one or more messages from the memory of the first communications interface to the memory of the second communications interface in response to receiving the dragging input.

19. A system comprising one or more memory storage areas coupled to one or more processor devices, the one or more processor devices configured to:

receive input placing one or more graphical images on a pane to configure one or more communications interfaces for subsequent use, wherein (a) placing is selected from the group consisting of dragging and dropping, inserting, copying and pasting, and cutting and pasting, (b) each graphical image is associated with one or more communications profiles, and (c) each of the one or more communications profiles comprises a plurality of predefined communications parameters for configuring a communications interface;

identify the one or more communications profiles associated with the respective one or more graphical images placed on the pane;

receive input initiating a configuration of the one or more communications interfaces in accordance with the one or more communications profiles associated with the respective one or more graphical images;

configure the one or more communications interfaces in accordance with the one or more communications profiles and the plurality of predefined communications parameters associated with the respective one or more graphical images;

cause display of one or more messages from a queue of a first communications interface of the one or more communications interfaces;

receive input dragging at least one of the one or more messages from the queue of the first communications interface to a queue of a second communications interface; and transmit the at least one of the one or more messages from the queue of the first communications interface to the queue of the second communications interface in response to receiving the dragging input.

20. The system of claim 19, wherein configuring comprises generating and transmitting one or more configuration files to the one or more communications interfaces respectively.

21. The system of claim 20, wherein the input received placing the one or more graphical images on the pane comprises input dragging the one or more graphical images on the pane.

* * * * *